United States Patent
Koshiba

(10) Patent No.: US 10,242,460 B2
(45) Date of Patent: Mar. 26, 2019

(54) IMAGING APPARATUS, CAR, AND VARIATION DETECTION METHOD

(71) Applicant: KYOCERA Corporation, Kyoto (JP)

(72) Inventor: Yasushi Koshiba, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/513,838

(22) PCT Filed: Sep. 25, 2015

(86) PCT No.: PCT/JP2015/004894
§ 371 (c)(1),
(2) Date: Mar. 23, 2017

(87) PCT Pub. No.: WO2016/047150
PCT Pub. Date: Mar. 31, 2016

(65) Prior Publication Data
US 2017/0297505 A1    Oct. 19, 2017

(30) Foreign Application Priority Data

Sep. 26, 2014  (JP) .................................. 2014-196933

(51) Int. Cl.
*G06T 7/80* (2017.01)
*H04N 5/225* (2006.01)
(Continued)

(52) U.S. Cl.
CPC .............. *G06T 7/80* (2017.01); *G06T 1/0007* (2013.01); *G06T 7/0004* (2013.01); *H04N 5/225* (2013.01);
(Continued)

(58) Field of Classification Search
None
See application file for complete search history.

(56) References Cited

U.S. PATENT DOCUMENTS

| 8,350,916 | B2 | 1/2013 | Ohmiya et al. |
| 2010/0245604 | A1* | 9/2010 | Ohmiya .................. G03B 5/00 348/208.99 |

(Continued)

FOREIGN PATENT DOCUMENTS

| JP | 2004-1658 A | 1/2004 |
| JP | 2004-173037 A | 6/2004 |

(Continued)

OTHER PUBLICATIONS

International Search Report issued in PCT/JP2015/004894; dated Dec. 15, 2015.
Written Opinion issued in PCT/JP2015/004894; dated Dec. 15, 2015; with English language Concise Explanation.

*Primary Examiner* — Jwalant Amin
(74) *Attorney, Agent, or Firm* — Studebaker & Brackett PC

(57) ABSTRACT

Information is acquired to contribute to determining the existence of at least one of an attachment anomaly in attachment of an imaging unit to a car and an attachment anomaly in attachment of a predetermined fixed object to the car. An imaging apparatus includes an imaging unit and an image processor. The imaging unit captures an image of the surroundings of the car. The image processor detects continuous variation of a predetermined subject appearing in at least one predetermined region that is a portion of the entire region of the image captured by the imaging unit. The image processor makes a determination of whether an attachment anomaly exists based on the continuous variation.

5 Claims, 3 Drawing Sheets

(51) Int. Cl.
*H04N 5/232* (2006.01)
*H04N 7/18* (2006.01)
*G06T 1/00* (2006.01)
*G06T 7/00* (2017.01)
*B60R 11/04* (2006.01)
*B60R 11/00* (2006.01)

(52) U.S. Cl.
CPC ......... *H04N 5/232* (2013.01); *H04N 5/23229* (2013.01); *H04N 7/18* (2013.01); *H04N 7/183* (2013.01); *B60R 11/04* (2013.01); *B60R 2011/004* (2013.01); *B60R 2300/308* (2013.01); *B60R 2300/60* (2013.01); *G06T 2207/10016* (2013.01); *G06T 2207/30252* (2013.01)

(56) References Cited

U.S. PATENT DOCUMENTS

2015/0347830 A1 12/2015 Nakata et al.
2016/0347251 A1 12/2016 Shigemura

FOREIGN PATENT DOCUMENTS

| JP | 2004173037 A | * | 6/2004 |
| JP | 2013-066046 A | | 4/2013 |
| JP | 2013066046 A | * | 4/2013 |
| JP | 2014-125029 A | | 7/2014 |
| WO | 2009/072264 A1 | | 6/2009 |
| WO | 2015/118806 A1 | | 8/2015 |

* cited by examiner

IMAGING APPARATUS, CAR, AND VARIATION DETECTION METHOD

CROSS-REFERENCE TO RELATED APPLICATION

This application claims priority to and the benefit of Japanese Patent Application No. 2014-196933 filed Sep. 26, 2014 and PCT Application No. PCT/JP2015/004894 filed on Sep. 25, 2015, the entire contents of which are incorporated herein by reference.

TECHNICAL FIELD

The present disclosure relates to an imaging apparatus that images the surroundings of a car, to a car, and to a variation detection method.

BACKGROUND

In order to support driving of a vehicle, such as a car, a camera system that performs object recognition processing on images captured by imaging units mounted in the vehicle has been proposed.

SUMMARY

An imaging apparatus according to a first aspect includes:
an imaging unit configured to capture an image of surroundings of a car; and
an image processor configured to detect continuous variation of a predetermined subject appearing in at least one predetermined region that is a portion of an entire region of the image captured by the imaging unit, and to make a determination of whether an attachment anomaly exists in at least one of attachment of the imaging unit to the car and attachment of the predetermined subject to the car based on the continuous variation.

A car according to a second aspect includes:
an imaging apparatus comprising an imaging unit configured to capture an image of surroundings of a car, and an image processor configured to detect continuous variation of a predetermined subject appearing in at least one predetermined region that is a portion of an entire region of the image captured by the imaging unit, and to make a determination of whether an attachment anomaly exists in at least one of attachment of the imaging unit to the car and attachment of the predetermined subject to the car based on the continuous variation.

While the solution to the problem in the present disclosure has been described above in terms of apparatuses, the present disclosure may also be implemented as methods, programs, or recording media storing programs that substantially correspond to these apparatuses, and such methods, programs, and recording media are to be understood as included in the scope of the present disclosure.

For example, a variation detection method according to a third aspect to implement the present disclosure as a method includes:
capturing an image of surroundings of a car;
detecting continuous variation of a predetermined subject appearing in at least one predetermined region that is a portion of an entire region of the image that is captured; and
making a determination of whether an attachment anomaly exists in at least one of attachment of an imaging unit to the car and attachment of the predetermined subject to the car based on the continuous variation, the imaging unit capturing an image of surroundings of the car.

DETAILED DESCRIPTION

In a conventional camera system, the imaging units need to be attached so as not to vary relative to the vehicle. The attachment to the vehicle, however, might loosen due to vibration or the like during driving. If attachment to the vehicle loosens, the imaging units may vibrate during driving of the vehicle, and the captured images may blur due to the vibration. As a result of blurring, the accuracy of object recognition processing might degrade. Therefore, it would be helpful to provide an imaging apparatus, a car, and a variation detection method that can determine the existence of at least one of an attachment anomaly in attachment of the imaging unit to the car and an attachment anomaly in attachment of a predetermined fixed object to the car. According to the aforementioned imaging apparatus, car, and variation detection method, the existence of at least one of an attachment anomaly in attachment of an imaging unit to a car and an attachment anomaly in attachment of a predetermined fixed object to a car can be determined. With reference to the drawings, the following describes embodiments of the present disclosure in detail.

Figure 1:
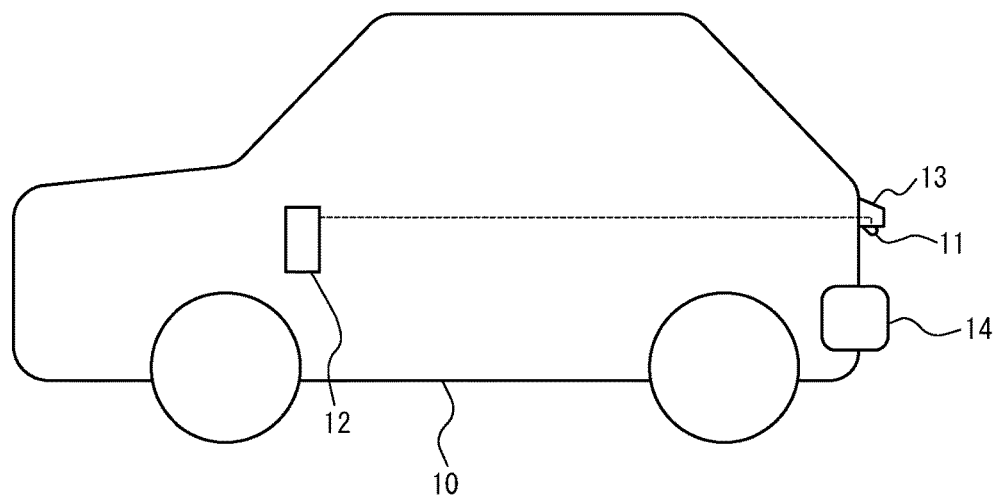
FIG. 1 is a layout drawing illustrating the layout of an imaging apparatus and display apparatus in a vehicle in which an imaging apparatus according to one of the embodiments of the present disclosure is mounted.

As illustrated in FIG. 1, a vehicle 10 that, for example, is a car includes an imaging apparatus 11 and a display apparatus 12. At least an imaging unit of the imaging apparatus 11 is fixed to some location on the vehicle 10 so that an arbitrary fixed object that is fixed to the vehicle 10 is included within an imaging range. In this embodiment, the entire imaging apparatus 11 is fixed to the rear exterior of the vehicle 10 so that a rear garnish 13 and a bumper 14, which are fixed objects fixed to the rear of the vehicle 10, are included in the imaging range. The display apparatus 12 is provided at a position visible from the driver's seat. The display apparatus 12 may, for example, be the display of a car navigation system. The display apparatus 12 displays images acquired from the imaging apparatus 11.

Figure 2:
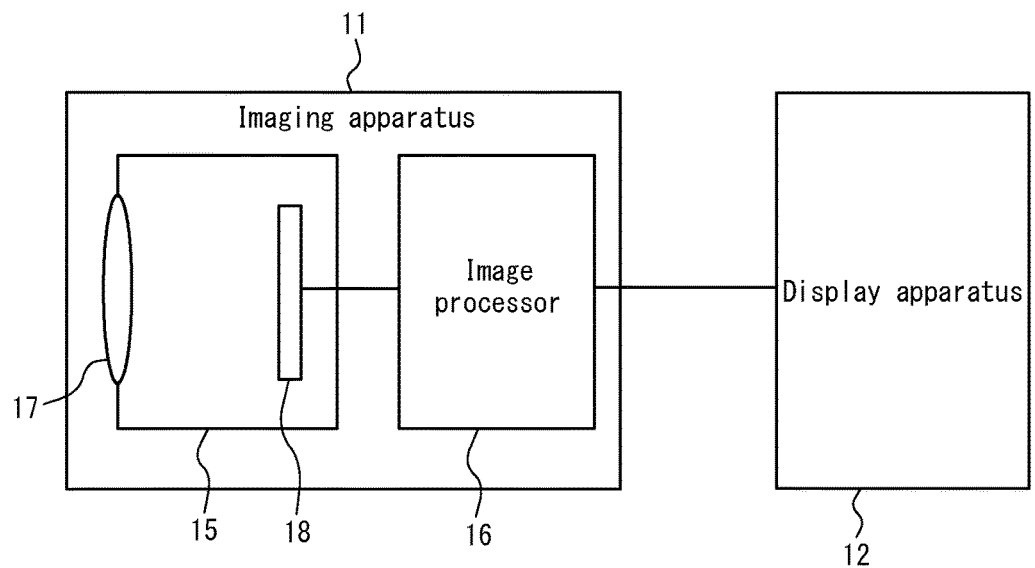
FIG. 2 is a block diagram schematically illustrating the structure of the imaging apparatus in FIG. 1 along with the display apparatus.

Next, the configuration of the imaging apparatus 11 is described. As illustrated in FIG. 2, the imaging apparatus 11 includes an imaging unit 15 and an image processor 16.

The imaging unit 15 includes an optical system 17 and an image pickup device 18. The optical system 17 includes a wide-angle lens, such as a fisheye lens, and forms an image of the surroundings behind the vehicle 10 on a light-receiving surface of the image pickup device 18. The image pickup device 18 may, for example, be a CMOS image sensor and a CCD image sensor and captures the image formed on the light-receiving surface.

The image processor 16 is, for example, a DSP and applies predetermined image processing to the image captured by the imaging unit 15, such as color interpolation, white balance adjustment, contour enhancement, or the like. The image processor 16 also performs object recognition on the image and determines whether a contour drawn within the image is a predetermined object targeted for recognition. The image processor 16 may be provided in the same housing as the imaging unit 15 or in a separate housing.

Figure 3:
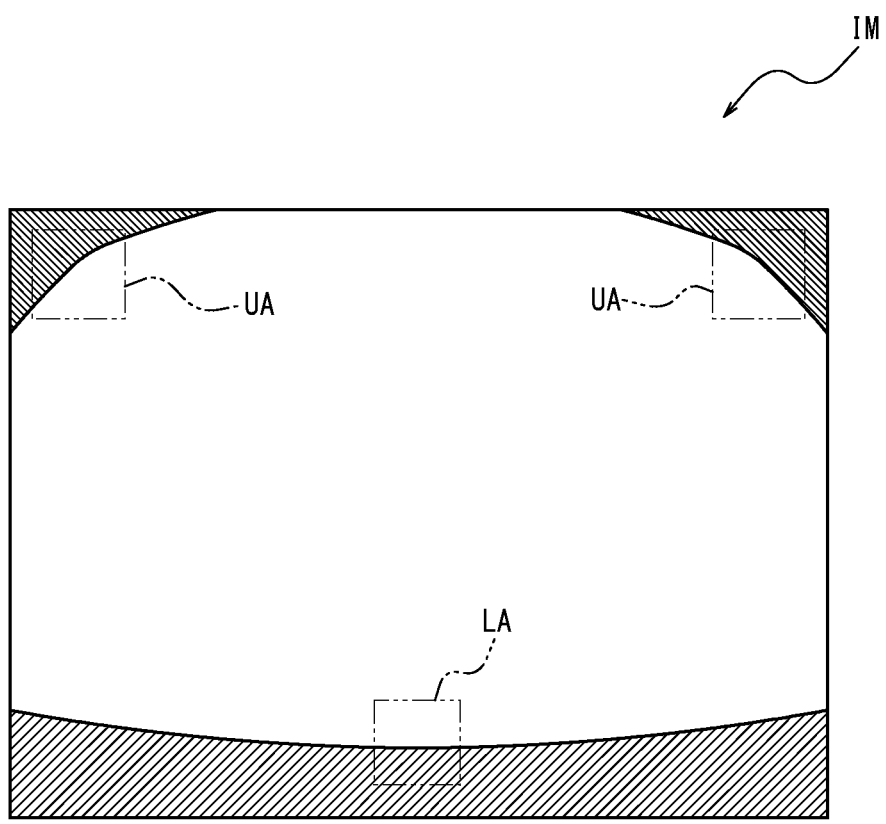
FIG. 3 illustrates predetermined regions in the image captured by the imaging unit in FIG. 1.

The image processor 16 can detect continuous variation in a predetermined subject. In order to detect continuous variation in a predetermined subject, the image processor 16 extracts a predetermined region that has a predetermined position and size and is a portion of the entire region of the image captured by the imaging unit 15. The predetermined region is at least one region that sufficiently allows recognition of an image of a fixed object, such as the rear garnish 13 or the bumper 14. For example, as illustrated in FIG. 3, the predetermined region is at least one region in the image IM captured by the imaging unit 15, such as the regions UA near the edges at the upper side in the vertical direction and the region LA near the center at the lower side in the vertical direction. A region that sufficiently allows recognition of an image of a fixed object refers, for example, to a region such that 20% to 80% of the region is occupied by the image of the fixed object.

Each predetermined region is defined in advance at the time of manufacturing the imaging apparatus 11. For example, when the specifications of the imaging apparatus 11 stipulate attachment to a particular position on a particular model of car, then the position where the image of a fixed object exists in the captured image is a set position, and a region near this position is defined as a predetermined region.

The predetermined region may also be defined by either or both of manual input by the user and automatic setting by the image processor 16. During manual input by the user, for example a region in an image displayed on the display apparatus 12 is designated using an input interface of the display apparatus 12 or the like. This region is then defined as a predetermined region. During automatic setting by the image processor 16, for example among images that are different frames acquired from the imaging unit 15, i.e. images with different capture times, for example a predetermined region for which the image variation, such as variation in the contour position or variation in brightness, is less than a threshold is defined as a predetermined region.

The image processor 16 detects information related to location of the image of a fixed object appearing as a predetermined subject in the extracted predetermined region. The information related to location may, for example, be the edge position of the fixed object, the ratio of area occupied by the image of the fixed object in the predetermined region, or the like. The image processor 16 detects information related to location in continuously acquired images of different frames. Based on the information related to location detected in continuously acquired images of different frames, i.e. based on the change over time in the information related to location, the image processor 16 detects continuous variation of a predetermined subject.

Furthermore, based on the detected continuous variation, the image processor 16 determines whether at least one of an attachment anomaly in attachment of the imaging unit 15 to the vehicle 10 and an attachment anomaly in attachment of the predetermined subject to the vehicle 10 exists. For example, the image processor 16 determines that an attachment anomaly has occurred when the Fourier transform of the change over time of information related to location has a peak at the frequency of a specific band.

When there is a plurality of predetermined regions in which consecutive variation of a predetermined subject is detected, the image processor 16 determines the site at which an attachment anomaly has occurred based on the region(s) in which an attachment anomaly is determined to have occurred. For example, when determining that an attachment anomaly has occurred in every predetermined region, the image processor 16 determines that an attachment anomaly has occurred in attachment of the imaging unit 15 to the vehicle 10. When determining that an attachment anomaly has occurred in a portion of the predetermined regions, for example, the image processor 16 determines that an attachment anomaly has occurred in attachment, to the vehicle 10, of the predetermined subject whose image is included in the portion of the predetermined regions.

The image processor 16 overlays the result of the determination of the existence of an attachment anomaly on the image of the surroundings of the vehicle 10, transmits the image to the display apparatus 12, and causes the image to be displayed.

Figure 4:
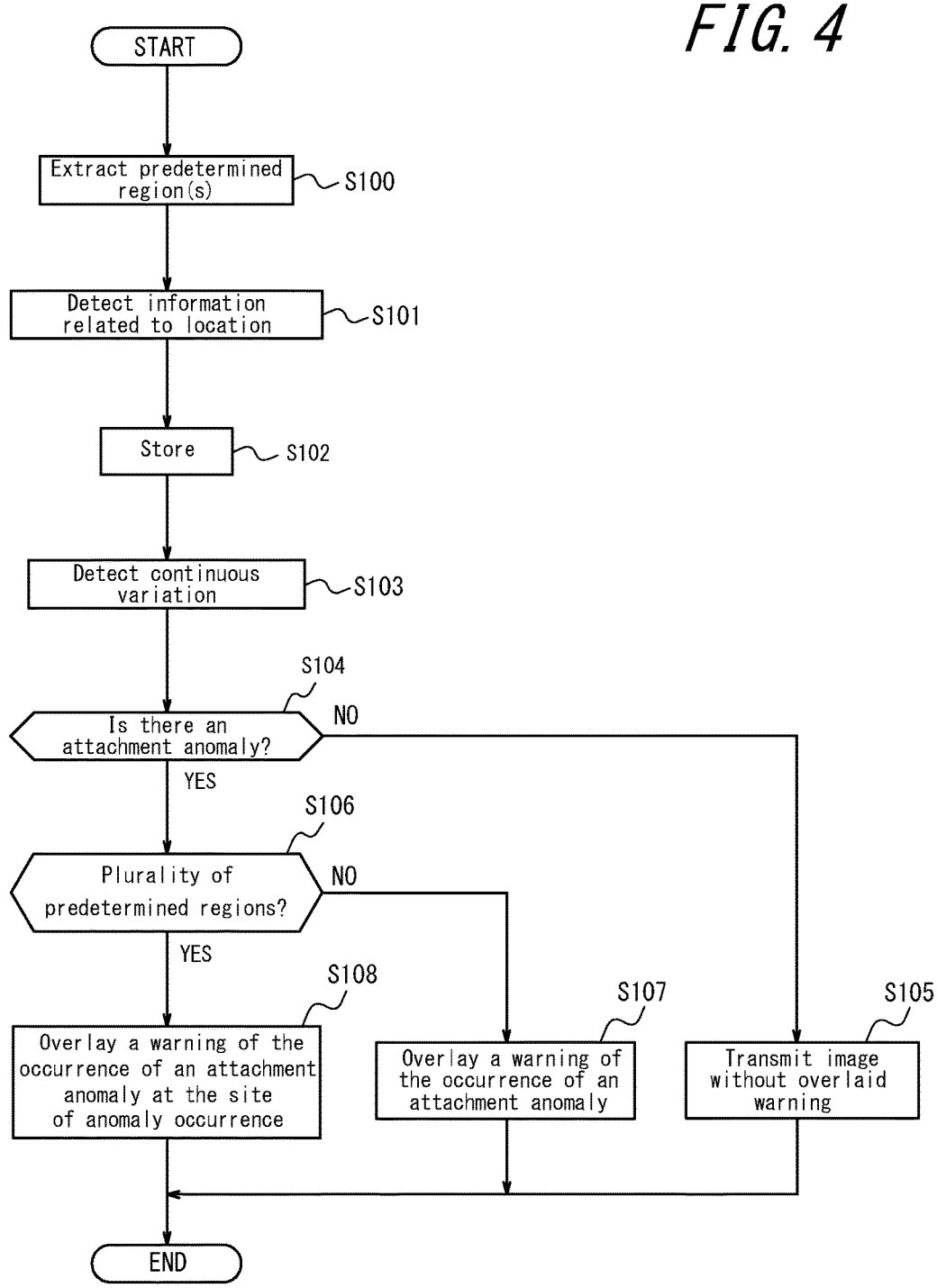
FIG. 4 is a flowchart illustrating processing executed by the image processor in FIG. 2 to determine the existence of an attachment anomaly.

Next, the processing executed by the image processor 16 in this embodiment to determine the existence of an attachment anomaly is described with reference to FIG. 4. The image processor 16 executes processing to determine the existence of an attachment anomaly each time one frame image is acquired from the imaging unit 15.

In step S100, the image processor 16 extracts predetermined region(s) from the entire region of the acquired image. Upon extraction of the predetermined region(s), the process proceeds to step S101.

In step S101, the image processor 16 detects information related to the location of a predetermined subject in the predetermined region(s) extracted in step S100.

In step S102, the image processor 16 stores the information related to location detected in step S101 in a working memory of the image processor 16. Upon storage of the information related to location, the process proceeds to step S103.

In step S103, the image processor 16 reads, from the working memory, the information related to location that was stored in the working memory and was detected in frame images during a predetermined time period counting backward from the present. Furthermore, based on the change over time in the read information related to location, the image processor 16 detects continuous variation of a predetermined subject. Upon detection of continuous variation, the process proceeds to step S104.

In step S104, the image processor 16 determines whether an attachment anomaly has occurred in the predetermined region(s) based on the continuous variation of the predetermined subject in the predetermined region(s). Upon a determination that an attachment anomaly has not occurred, the process proceeds to step S105. Conversely, upon a determination that an attachment anomaly has occurred, the process proceeds to step S106.

In step S105, the image processor 16 transmits an image, acquired from the imaging unit 15 and to which predetermined image processing is applied, to the display apparatus 12. The image processor 16 then causes the display apparatus 12 to display a regular image, with no warning of an attachment anomaly. After image transmission, the processing to determine the existence of an attachment anomaly ends.

In step S106, the image processor 16 determines whether continuous variation in a predetermined subject was detected in a plurality of predetermined regions. When continuous variation was detected in only one predetermined region, the process proceeds to step S107. When continuous variation was detected in a plurality of predetermined regions, the process proceeds to step S108.

In step S107, the image processor 16 overlays a warning on an image that is acquired from the imaging unit 15 and to which predetermined image processing is applied. The warning indicates that an attachment anomaly in the attachment of the imaging unit 15 or a predetermined subject to the vehicle 10 has occurred. Next, the image processor 16 transmits the image with the overlaid warning to the display apparatus 12 and causes the display apparatus 12 to display the image with the overlaid warning of an attachment anomaly. After image transmission, the processing to determine the existence of an attachment anomaly ends.

In step S108, the image processor 16 detects the site at which an attachment anomaly has occurred based on the predetermined regions in which an attachment anomaly is determined to have occurred. Next, the image processor 16 overlays a warning on an image that is acquired from the imaging unit 15 and to which predetermined image processing is applied. The warning indicates that an attachment anomaly has occurred at the detected site of occurrence. Furthermore, the image processor 16 transmits the image with the overlaid warning to the display apparatus 12 and causes the display apparatus 12 to display the image with the overlaid warning of an attachment anomaly. After image transmission, the processing to determine the existence of an attachment anomaly ends.

According to the imaging apparatus 11 of this embodiment with the above configuration, it can be determined whether an attachment anomaly exists in at least one of attachment of the imaging unit 15 to the vehicle 10 and attachment of a fixed object to the vehicle 10.

According to the imaging apparatus 11 of this embodiment, the site at which an attachment anomaly has occurred can also be determined based on continuous variation of the predetermined subject in each of a plurality of predetermined regions.

According to the imaging apparatus 11 of this embodiment, the result of the determination is overlaid on the image. Therefore, the driver can be notified of the attachment anomaly when the attachment anomaly occurs.

The present disclosure is based on the drawings and on embodiments, yet it should be noted that a person of ordinary skill in the art could easily make a variety of modifications and adjustments based on the present disclosure. Therefore, such changes and modifications are to be understood as included within the scope of the present disclosure.

The invention claimed is:

1. An imaging apparatus comprising:
    an imaging unit configured to capture an image of surroundings of a car; and
    an image processor configured to detect information related to location of a predetermined subject appearing in at least one predetermined region that is a portion of an entire region of each of the images of different frames captured by the imaging unit, and to make a determination of whether an attachment anomaly exists in at least one of attachment of the imaging unit to the car and attachment of the predetermined subject to the car based on Fourier transform of change over time of the information related to location, wherein
    the at least one predetermined region comprises a plurality of predetermined regions, and
    the image processor makes a determination of whether the attachment anomaly has occurred in attachment of the imaging unit to the car or in attachment of the predetermined subject to the car based on continuous variation of the predetermined subject appearing in each of the plurality of predetermined regions.

2. The imaging apparatus of claim 1, wherein the image processor detects the continuous variation based on at least one of an edge position of the predetermined subject in the predetermined region and area occupied by the predetermined subject in the predetermined region.

3. The imaging apparatus of claim 1, wherein the image processor overlays a display of a result of the determination on the image.

4. A car comprising:
    an imaging apparatus comprising an imaging unit configured to capture an image of surroundings of a car; and
    an image processor configured to detect information related to location of a predetermined subject appearing in at least one predetermined region that is a portion of an entire region of each of the images of different frames captured by the imaging unit, and to make a determination of whether an attachment anomaly exists in at least one of attachment of the imaging unit to the car and attachment of the predetermined subject to the car based on Fourier transform of change over time of the information related to location, wherein
    the at least one predetermined region comprises a plurality of predetermined regions, and
    the image processor makes a determination of whether the attachment anomaly has occurred in attachment of the imaging unit to the car or in attachment of the predetermined subject to the car based on continuous variation of the predetermined subject appearing in each of the plurality of predetermined regions.

5. A variation detection method comprising:
    capturing an image of surroundings of a car;
    detecting, by an image processor, information related to location of a predetermined subject appearing in at least one predetermined region that is a portion of an entire region of each of the images of different frames that are captured; and
    making, by the image processor, a determination of whether an attachment anomaly exists in at least one of attachment of an imaging unit to the car and attachment of the predetermined subject to the car based on Fourier transform of change over time of the information related to location, the imaging unit capturing an image of surroundings of the car, wherein
    the at least one predetermined region comprises a plurality of predetermined regions, and
    the image processor makes a determination of whether the attachment anomaly has occurred in attachment of the imaging unit to the car or in attachment of the predetermined subject to the car based on continuous variation of the predetermined subject appearing in each of the plurality of predetermined regions.

* * * * *